United States Patent
Bird et al.

(10) Patent No.: US 10,058,798 B2
(45) Date of Patent: Aug. 28, 2018

(54) OUTLET WELL COVER FOR AN IN-LINE GREASE INTERCEPTOR

(71) Applicant: CANPLAS INDUSTRIES LTD., Barrie (CA)

(72) Inventors: Andrew Bird, Shanty Bay (CA); Rick Parkinson, Barrie (CA); Timothy James Poupore, Toronto (CA); Michael F. Wilson, Toronto (CA); Steve Armstrong, Toronto (CA)

(73) Assignee: Canplas Industries Ltd., Barrie, Ontario (CA)

( * ) Notice: Subject to any disclaimer, the term of this patent is extended or adjusted under 35 U.S.C. 154(b) by 316 days.

(21) Appl. No.: 14/875,052

(22) Filed: Oct. 5, 2015

(65) Prior Publication Data

US 2016/0101374 A1    Apr. 14, 2016

(30) Foreign Application Priority Data

Oct. 9, 2014  (CA) ...................... 2866911

(51) Int. Cl.
| | | |
|---|---|---|
| *B01D 17/02* | (2006.01) | |
| *B01D 21/24* | (2006.01) | |
| *E03F 5/16* | (2006.01) | |
| *C02F 1/40* | (2006.01) | |

(52) U.S. Cl.
CPC ...... *B01D 17/0208* (2013.01); *B01D 21/2444* (2013.01); *C02F 1/40* (2013.01); *E03F 5/16* (2013.01)

(58) Field of Classification Search
CPC ............ B01D 17/0208; B01D 21/2444; B01D 21/0042; B01D 21/0003; B01D 2201/48; C02F 1/40; C02F 2103/32; E03F 5/16; E03F 5/14

USPC .......................................... 210/540
See application file for complete search history.

(56) References Cited

U.S. PATENT DOCUMENTS

| | | | |
|---|---|---|---|
| 2,439,633 A * | 4/1948 | Reinhart | B01D 24/12 137/590.5 |
| 6,645,387 B2 | 11/2003 | Naski et al. | |
| 6,951,619 B2 | 10/2005 | Bryant | |
| 7,367,459 B2 | 5/2008 | Batten et al. | |
| 7,540,967 B2 | 6/2009 | Batten et al. | |
| 7,641,805 B2 | 1/2010 | Batten et al. | |
| 8,252,188 B1 | 8/2012 | Batten et al. | |
| 2012/0055798 A1* | 3/2012 | Selden | B01L 3/502707 204/600 |

* cited by examiner

*Primary Examiner* — David C Mellon
*Assistant Examiner* — Liam Royce
(74) *Attorney, Agent, or Firm* — Hoffman & Baron, LLP (57) ABSTRACT

An outlet well cover for use in an in-line grease interceptor is disclosed. The outlet well cover is fitted onto a hollow well extending upwardly from the bottom of the grease interceptor tank, and having an open top. The outlet well cover has at least one, and preferably two arms that extend outwards and define water passageways from the ends of the arms to the middle of the well. Water inflow openings at the ends of the arms allow clarified water to flow into the covered hollow well. The water inflow openings face generally downward to limit the amount of floating FOG material that can be drawn in through the openings. The well cover may also include a central bore adapted to receive a standard sized pipe. The pipe can be connected to an outlet from the tank.

12 Claims, 5 Drawing Sheets

OUTLET WELL COVER FOR AN IN-LINE GREASE INTERCEPTOR

FIELD OF THE INVENTION

This invention relates generally to the field of wastewater management and in particular to grease interceptors of the sort that are used on wastewater outflows from, for example, commercial food establishments. Grease interceptors are typically used to prevent fats, oils and grease from entering the sanitary sewage system. Most particularly, this invention relates to larger scale grease interceptors and components for use in such a larger scale in-line grease interceptors.

BACKGROUND OF THE INVENTION

In many food preparation facilities, such as commercial kitchens and restaurants, the sink is a major tool used for disposing of various types of food waste. In some cases liquid food wastes, such as fats, oils and grease are poured down the sink, and in other cases a mechanical device such as a garbage disposal is used to shred the food waste as it leaves the sink and enters the wastewater system. Many food preparation establishments, such as commercial restaurants and the like, have multiple sinks for such food waste disposal.

In many jurisdictions, the disposal from commercial kitchens of floating food wastes such as Fats, Oils and Greases (FOG) into the sanitary sewage system is prohibited. There are a number of reasons why this is so, including the ability of those types of materials to clog or plug sanitary sewage systems and the difficulty of adequately treating such materials in a sewage treatment facility. Therefore, many jurisdictions require that these materials be removed from the wastewater stream before permitting the wastewater stream to be added to the sanitary sewer system.

As a result, devices known as grease interceptors have been developed. These grease interceptors are hydraulically connected to the wastewater outflow stream from the food preparation kitchen or other facility and are located before the sanitary sewer, typically within the kitchen. The grease interceptors may take a number of forms, but typically consist of an in-line container which is mounted at or below grade on the wastewater outflow line downstream of all of the sinks and the like. The container includes features that are configured to allow fats, oils and grease to float to the surface of the container where they can be skimmed off and physically removed to a landfill site.

In some circumstances larger sized grease interceptors which may be positioned outside of the building foot print to capture FOG before it can leave the property of the food service establishment are appropriate. Such larger scale devices have some advantages, including separating the device, which can emit very foul odours when being emptied, from the inside of the kitchen; permitting a larger volume device to be used because there is no concern about fitting into a restrictive building floor plan; and extending the time between service calls, because the interceptors can be made to contain much larger volumes. As well by being outside, services such as pump out trucks can come and go easily without disturbing the patrons of the food service establishment.

An issue with such large scale interceptors is the design of the components and fittings that are suitable for reliably separating the water from the FOG and any solids which might be found in the waste water. In general, in larger scale interceptors they will be permanently installed, below grade, which can make them more difficult to properly clean out when being serviced. In general the solids tend to sink while the FOG tends to float leaving the water in the middle. What is required is an easily assembled system or assembly which can reliably allow water to flow out of the grease trap while preventing the passing of either solids or FOG. Typically, in the prior art, an overflow weir is used to contain the heavier than water solids in one part of the tank and an underflow weir is used to control the lighter than water floating waste such as FOG. However the use of such weirs can create cleaning problems as the waste material, particularly the floating FOG can tend to spread out throughout the interceptor as the liquid level is lowered, for example, during a pumping clean out. The weirs can create closed spaces into which such semisolid wastes can flow and which can be very difficult to properly clean from the outside. Examples of prior art devices can be found in the following prior patents and applications:

U.S. Pat. No. 6,645,387;
U.S. Pat. No. 6,951,619;
U.S. Pat. No. 7,367,459;
U.S. Pat. No. 7,540,967;
U.S. Pat. No. 7,641,805; and
U.S. Pat. No. 8,252,188.

What is desired is a simple and effective outflow path from the body of the permanently installed interceptor for the separated water. The outflow path should be configured to reduce the chance of solids, settling from above the outtake point from being allowed to be removed with the water. The outflow path should also be configured to prevent other materials such as buoyant or semi buoyant FOG from being allowed to follow the water through the outflow path. Preferably such an assembly would be easy to clean and simple to fabricate and use. Most preferably, such an outflow path can be made of easy to assemble and disassemble components to facilitate effective washing or cleaning as is periodically required, having regard to the permanently installed condition of the interceptor tank. Further, the components which define the outflow path would not form any closed off spaces or voids into which wastes can settle and from which wastes can be difficult to clean.

SUMMARY OF THE INVENTION

The present invention comprehends using a combination of profiled features formed into the primary containment vessel of the grease interceptor in conjunction with easily mouldable parts which can be assembled together to form a water outflow path. In particular the body of the vessel may have a well formed into the floor which rises up, in a vertical plane resembling a volcano-like shape, having a hollow center and an open top. The well may be spaced apart from the sides or ends of the body of the interceptor to make it easier to access. Solids which settle in the tank and form a layer at the bottom may collect generally below the level of the top of the volcano-like well. This allows the water to enter into the well at a level that is above the level at which solids may typically be found. A well cover may be used to cover the open top of the well. The well cover can include outwardly directed arms which define inlet water passageways from the ends of the arms to the middle of the well. The arms may have inlet openings on the arms which face downwardly. By facing in this downwardly direction the openings limit the amount of floating material that will be drawn in through the openings. In particular the openings are positioned at a location below the bottom of the layer of the FOG layer which tends to form at, and then extend below, the surface of the fluid in the tank. The well cover may also include a central bore which is adapted to receive a vertical riser pipe in a tight fitting frictional engagement, or secured by mechanical fasteners. The vertical pipe can be connected using common pipe fittings to an outlet from the tank whereby water can flow into and through the arms, into the well and then out of the well through the outlet pipe and out of the interceptor altogether into the sanitary sewer or the like. The vertical riser pipe can be reached from the outside of the interceptor when the cover is removed. Likewise it can be extended using standard jointing practices when used in deeper access locations, in both cases the well cover fitting and pipe may be positively retained and positioned by their engagement with an outlet assembly. The vertical riser in addition serves as a means to both access the well using a pressurized spray hose thereby forcing any accumulated debris back out into the tank where it can be removed. In this way the interceptor can be pumped out, and the outlet well can remain accessible in situ for cleaning of residual debris by pressurized washing from above the pressurized line being introduced via the vertical riser pipe.

The present invention may therefore provide an outflow path for clarified water which is spaced apart from the side or end walls and does not create a closed space into which separated wastes can significantly gather and be hard to remove or clean.

Therefore according to a preferred aspect the invention there is provided:

a system for withdrawing clarified water from a waste water interceptor tank, said system comprising:

a hollow well extending upwardly from a bottom of said tank, said hollow well having continuous side walls and having an open top, a removable fitting for covering said open top of said well, said fitting including at least one water inflow opening facing generally toward a bottom of said tank, an infiltration passageway to hydraulically connect said water inflow opening with an inside of said covered hollow well so water can flow from said tank into said covered hollow well and a water removal passageway extending from inside said hollow well to an outlet from said tank, through said removable fitting.

BRIEF DESCRIPTION OF THE DRAWINGS

Reference will now be made by way of example only to preferred embodiments of the invention by way of example only, by reference to the following drawings in which.

DETAILED DESCRIPTION OF THE PREFERRED EMBODIMENTS

Figure 1:
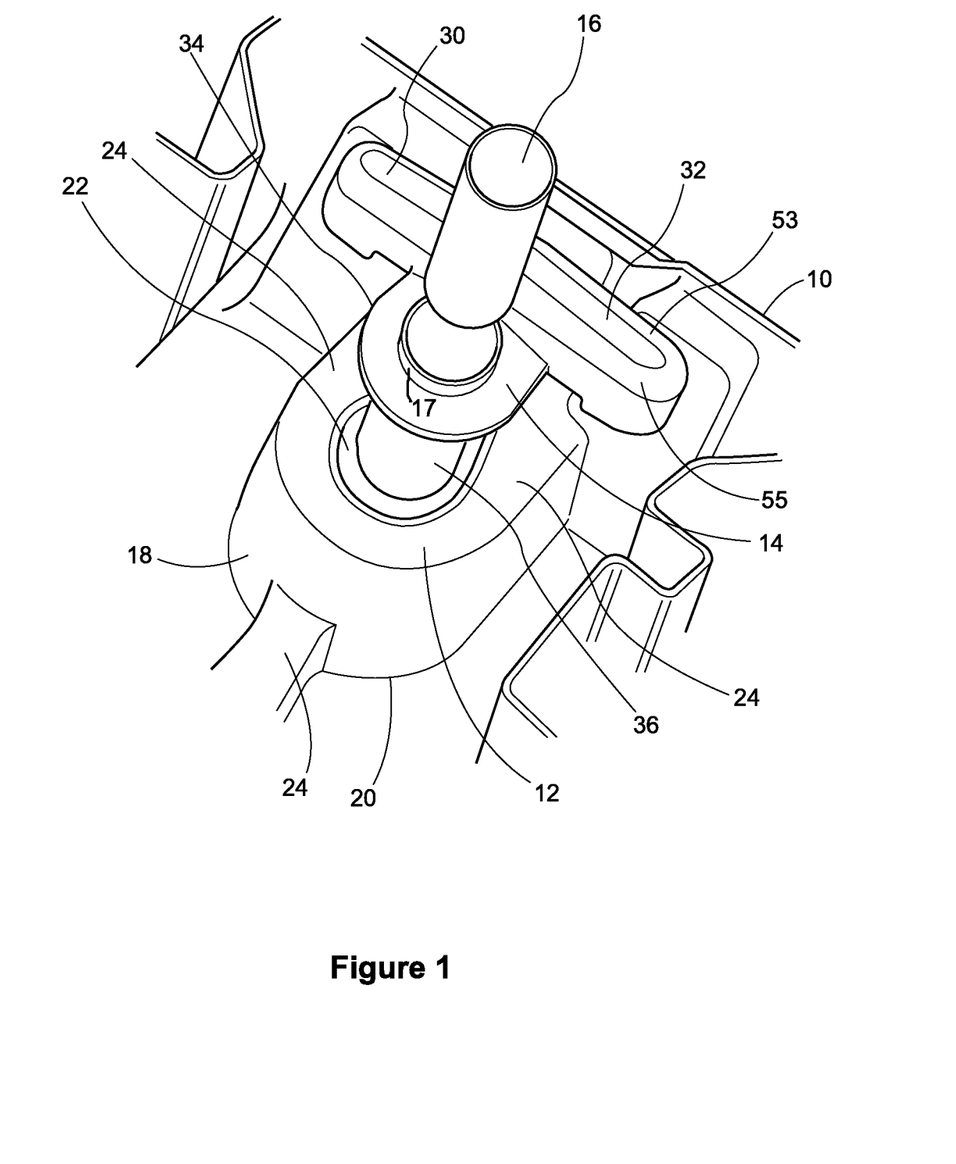
FIG. 1 is an exploded view of an assembly according to a preferred embodiment of the present invention.

FIG. 1 shows an assembly according to one embodiment of the present invention. The assembly includes a grease interceptor body 10 having a well 12, an outlet well cover 14 and a vertical riser pipe 16 all of which are explained in more detail below. The body 10 is preferably in the form of a closed tank or vessel, and may have a volume of between about 50 US Gallons and 1000 US Gallons most preferably about 250 US Gallons in liquid capacity when measured to the static water level of the vessel. The tank may be provided with an access port(s) for servicing, such as providing access for pump out or cleaning. The tank is to be hydraulically connected to a kitchen waste outflow in the usual manner and may be permanently installed below grade, for example but not limited to, outside of the building housing the food service facilities.

The body of the grease interceptor 10 may be made from molded plastic and includes various features that help separate, manage the flow of and prevent the transition of solids and FOG present in the body of the interceptor to the downstream drainage system. One of these features may be a well 12 which can be integrally molded or introduced as an independent assembly ultimately residing in the lower 24" of the tank. The well can have continuous side walls 18 which extend up from the bottom of the tank 20 to define a hollow center space 22. The tops of the walls 18 may be profiled to suit a combination of physical application and or manufacturing processes at 24 and be broad enough to define a support surface for the outlet well cover 14 as described below. The well can be positioned in the bottom wall of the tank so it is spaced apart from the end and side walls of the body so that it is more accessible through an access port or the like for the reasons explained below.

As can be appreciated the walls 18 of the well may be made a certain height and a range of between 6 (six) inches and 12 (twelve) inches, however approximately 9 (nine) inches is most preferred. The purpose of the wall height is to prevent solids, which fall by gravity and may settle to the bottom of the tank from entering the flow of water which is drawn into the well and then out of the interceptor. On the other hand the interceptor also collects FOG over time which will accumulate on top of the water and will extend down from the top surface of the liquids in the interceptor. The walls of the well cannot be so high so as to expose the top of the well to a normal level of FOG which may accumulate within the interceptor between normal service interval. The ideal height for removing water from the chamber is therefore above the level of solids which may accumulate at the bottom of the chamber and below the level of FOG which may accumulate in the upper part of the interceptor. Of course these levels change over time as more waste is accumulated and will be appreciated by those skilled in the art that the two would merge, leaving no water layer, if the interceptor was not serviced in a timely manner. However, the level of the height of the well walls will be understood to be above the height of a typical accumulation of solids and below the level of the typical thickness of floating FOG having regard to a normal level of maintenance or servicing of the hydraulic interceptor or grease trap by a pump out truck or the like.

Also shown is the well cover 14 which may include opposed outwardly extending arms 30 and 32, a well covering flange section 34 and an extended dip tube section 36. The extended dip tube section 36 is sized and shaped to fit within the hollow center space 22. The extended dip tube section 36 defines an opening 38 (best seen in FIG. 2) at its lower end which allows water which passes into the well to flow up through the vertical riser pipe 16.

The well covering flange section 34 may be sized and shaped to rest upon the top 24 of the walls 18 in a manner that prevents material from passing into the top of the well between the flange 34 and the top of the wall 24. Thus the covering flange section prevents floating FOG or solids which are settling within the interceptor from getting into the well. However, it is necessary to provide an unrestricted fluid passageway for clarified water into the well from the body of the interceptor, and that is the purpose of the outwardly extending arms 30, 32. As explained in more detail below, the arms 30, 32 form fluid passageways into the center of the well to permit water to pass into the top of the well's hollow center space 22 and then down through the well and then up and out of the well through the stem pipe section as shown by the arrows W in FIG. 2.

Also shown is a vertical riser pipe section 16 which is a fluid connection section to operatively fluidly connect the well and a sanitary sewer outlet for the interceptor. As will be understood the outlet on the interceptor will be positioned to permit waste water that flows into the interceptor to first fill the interceptor body and then when more waste water is added by flowing into an upstream end, it will cause water to spill out through the downstream outlet and into the sanitary sewer. The present invention therefore defines a preferred water separating assembly which defines a flow path to the spillway or outlet to allow the outlet water free of solids and FOG to flow out of the interceptor. Thus the solids and FOG have been very substantially removed from the water before it gets into the well. At the other end of the stem pipe section 16, the water is directed to the sanitary sewage system in the usual manner.

Figure 2:
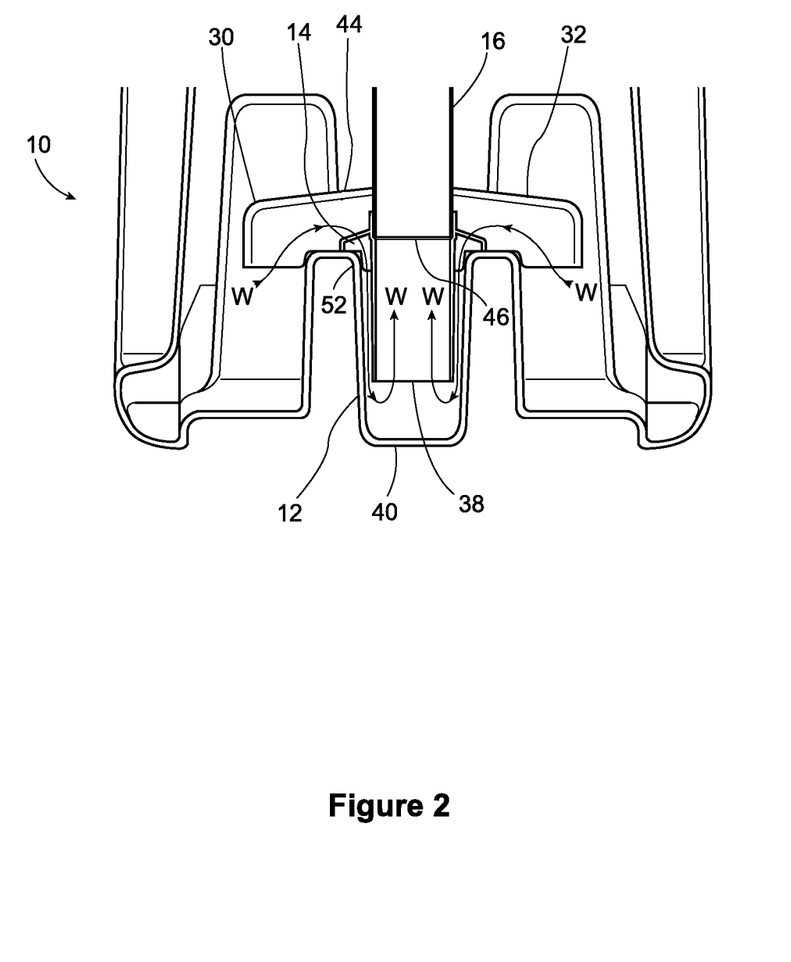
FIG. 2 is a cross sectional view of the assembly of FIG. 1.

FIG. 2 shows a cross sectional view through the well 12 of the present invention with the well cover 14 and vertical riser pipe 16 in place. As shown the well 12 may be tapered so that it is narrower at the bottom 40 and wider at the top 52. This helps in forming the well when integrally moulded as it provides a good draft for removing the part from the mold. In an alternate embodiment where introduced as separate assembly these draft angles may be significantly reduced or removed based on the manufacture and construction of the assembly. As shown the vertical riser pipe 16 fits snuggly into the top of the well cover at 44 to create an unrestricted (no cross sectional and therefore volume reduction, when compared to the inside diameter of the interceptor inlet connection) fluid pathway 46 which goes out of the well through the well cover 14 and into the vertical riser pipe 16. The parts 14 and 16 may preferably be just friction fit together independently or transitioning through a coupling component, or pipe connector 17, but without the use of fasteners or adhesives to permit the easy disassembly of the parts for cleaning when the interceptor is being serviced and cleaned for example. However, the present invention comprehends the use of adhesive or fasteners as well.

Figure 3:
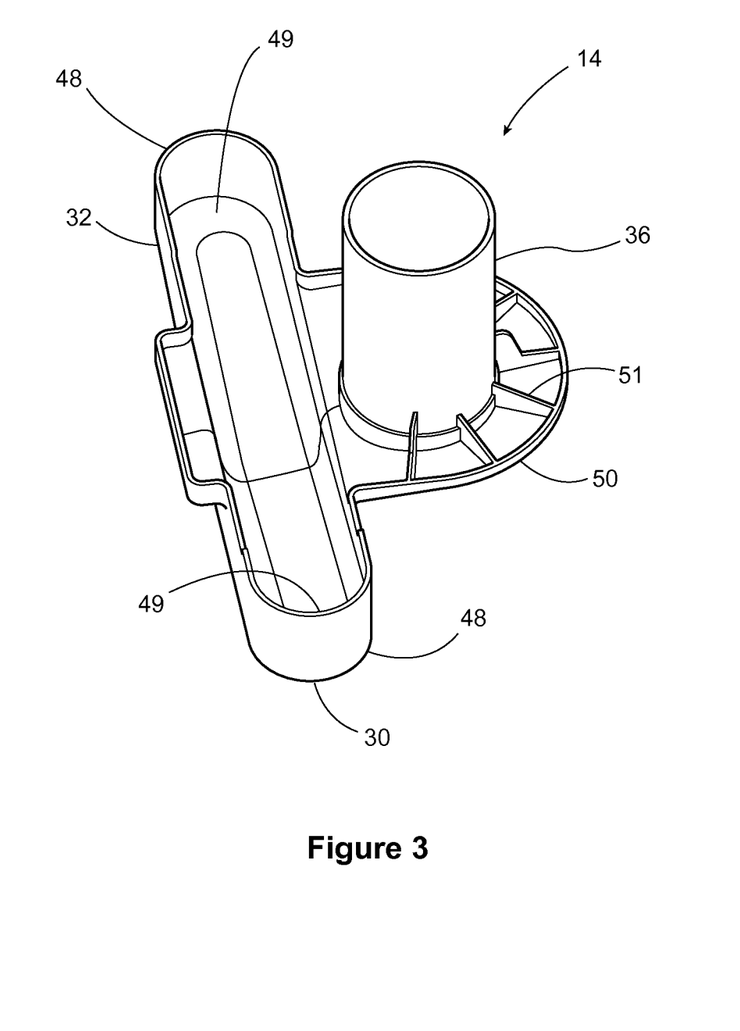
FIG. 3 is a bottom perspective view of the outlet well cover alone of FIG. 1.

FIG. 3 shows an underside view of the invention and in particular of the well cover 14. As shown the arms 30 and 32 are formed with cup like inlet ends 48 which define inlet passageways 49 to permit water to flow along the underside of the arms and then into the well 12. Part of the passageways 49 are defined by the top 24 of the walls 18 (FIG. 1) of the well 12 (not shown). The downwardly facing inlet ends 48 may be used to limit the amount of solids or FOG that gets taken up in the fluid passageways 49 by reason of the downwardly facing opening. Also shown are vertically oriented and specifically profiled ribs 51 extending radially outwardly from the extended dip tube 36. These radial rib details 51 serve to work collectively to positively but removably locate the outlet well cover relative to the well 22. A profiled lip 50 is used to vertically position and support the well outlet cover 14 by means of its interface with the top well surface 24. The ribs also may enhance the removability of the well cover 14.

Another aspect of the present invention can now be appreciated. Typically when being serviced an interceptor such as the type to which this invention refers will have the solids and FOG physically removed from the interior such as by being pumped out. In other words, the flow of waste water into the interceptor will be stopped temporarily and the interceptor opened up typically from above so the accumulated solids and FOG can be physically removed from inside of the body. Such removed material is then typically transported by licenced contractors for authorised disposal. Where suction is used to empty the interceptor a suction hose will be inserted into or connected to the body of the interceptor through an access opening or port and the FOG and solids will be sucked out. However as the fluid level drops in the body there will be a tendency for the FOG to settle lower and lower in the tank as it cannot all be removed at once. Any upwardly facing orifice runs the risk of being filled, by gravity, with the semi-solid FOG as the level of material in the interceptor goes down. This may be avoided with the present invention as the outlet well cover 14 covers the open top of the well 12 and presents no upwardly facing orifice into which such settling material can fall. This embodiment of the invention (best seen on FIG. 4) may therefore incorporate sloped upwardly facing surfaces at both oversize radii 54 and inclined surfaces 53 and 55 to positively promote the shedding of solid and semi-solid materials that may otherwise accumulate during both the pumping process and in normal operation.

Another aspect of the present invention is the use of two arms 30, 32 as shown. In this way the water flow may be divided evenly between to the two arms to draw water from both sides of the interceptor. It will be understood that best results may occur when the clarified water removed from the interceptor transitions from the tank to the outlet system with as little turbulence as possible. By separating the inlets on the inflow arms the present invention permits the flow to be divided between the two inlets and respective arms thus lowering the flow volume and speed of flow through either specific arm. As well, the separation of the arms helps to remove the outflow water gently from widely displaced portions of the tank allowing smoother draining of the tank through the overflow mechanism discussed above.

Figure 4:
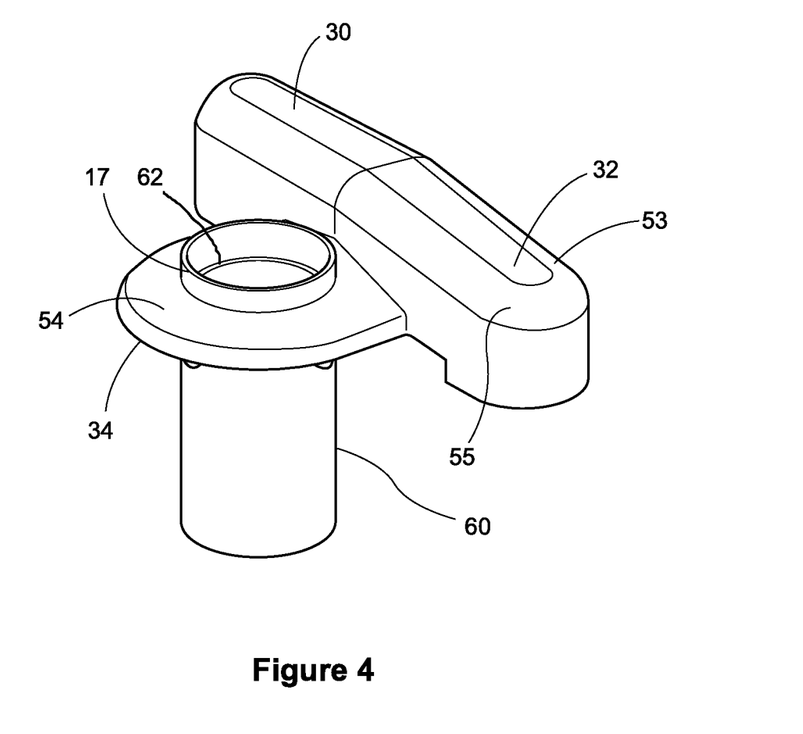
FIG. 4 is a top perspective view of an outlet well cover according to one embodiment of the present invention.

FIG. 4 shows the well cover of FIG. 3 from above and to one side. The arms 30, 32 are shown as well as the well cover flange 34. Also shown is the extended dip tube 60, which is sized to closely receive the outer diameter of the vertical riser pipe 16. This invention also considers an embodiment whereby a transitional coupling is used to positively but removably locate the vertical riser pipe 16 to the well covering flange section 34. A seating lip 62 can be used to allow positively positioning the vertical riser pipe 16 in its relative vertical position preventing over insertion and provides a secure seat where interfaced with the top of the extended dip tube 36. As shown the well cover can be made from a one piece plastic molded material. Plastics that are resistant to the wastes common in kitchen wastes are suitable and good results have been achieved with either PE (polyethylene) or PVC (polyvinylchloride) type of plastics. However good results have been achieved with PP (polypropylene).

Figure 5:
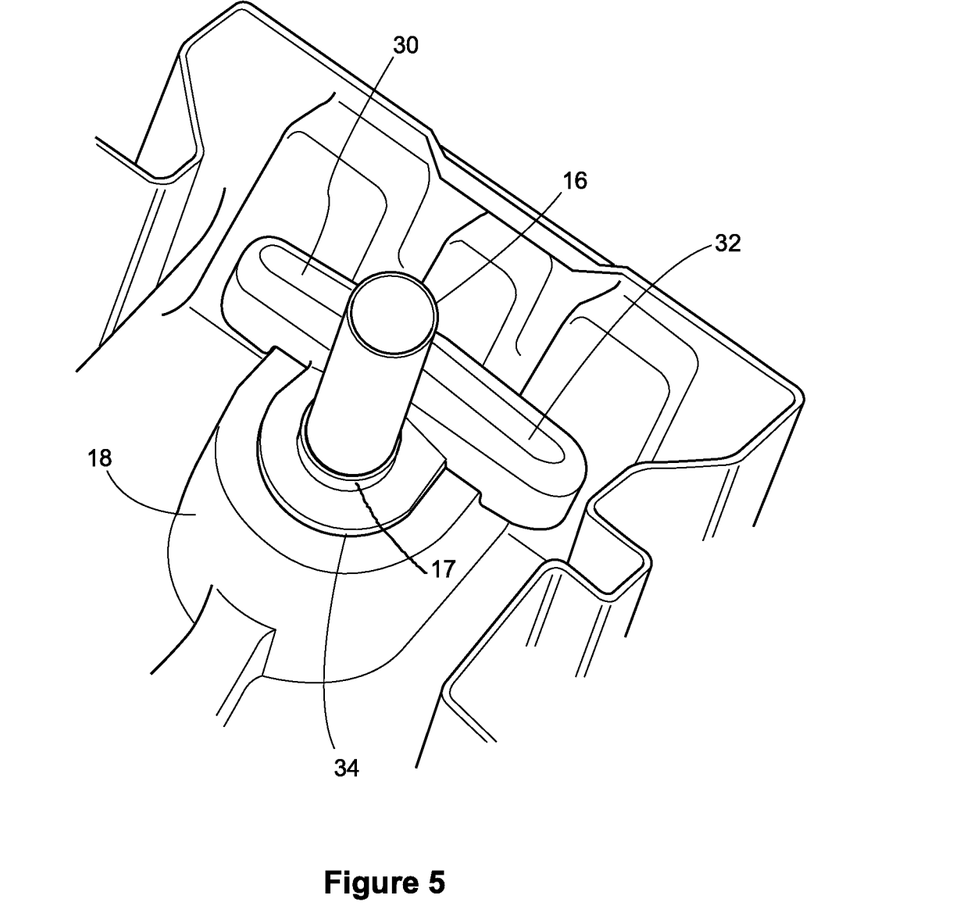
FIG. 5 is a perspective view of the components of FIGS. 1 and 2 assembled together according to the present invention.

FIG. 5 shows the present invention in the fully installed position within the interceptor. The components are frictionally fitted and retained together based on their positional relationship to the extended outlet piping assembly. Together they define an outflow path for clarified water to be removed from the interceptor. The water passageway 49 is preferably a predetermined size and one that is at least 80 mm in diameter can be used to meet certain code requirements as will be understood by those skilled in the art. However the flow path is not limited to such a diameter and other diameter flow paths can also be used according to local laws or customs.

It can now be appreciated how the present invention may be cleaned out when being serviced. As described above the first step in a clean out is to open or connect to an access port on the body of the interceptor and connect or insert a pump out hose for example to remove the accumulated wastes. As the waste is removed the semi-solid FOG will tend to spread out and coat all of the interior surfaces. Thus once the bulk of the material has been pumped out there will be some lesser amount of residual material left on the now exposed inside surfaces of the interceptor. Due to the decomposing nature of such wastes, such remaining material can be very foul and there is a need to remove it to complete the cleaning out process. Only in extreme cases would it be anticipated that the well cover would need to be removed, this being achieved by lifting out the stand pipe with the well cover attached having released it from the extended outlet piping assembly. It will be understood that the well cover is resting on and in the well, but is not attached thereto. Thus, the friction fit of the stand pipe into the well cover is enough to keep the parts together and for them to be lifted out of the body of the tank. At this point a spray hose can be used from above to spray off the interior surfaces and the spray water can then also be pumped out, the components that were taken out of the tank can also be washed, outside of the tank, and the once everything is clean and washed the components can be reassembled from the surface. All that is required is to lower the stand pipe down, fit the well cover onto the well and then connect the other end of the stand pipe to the extended outlet piping system to complete the fluid flow path. In this way the present invention provides a reliable flow path for the interceptor water which excludes those materials and wastes that are to be collected. As well the present invention presents a reasonably easy assembly for servicing and cleaning as compared to the fixed weir systems of the prior art. All of the assembly components of the present invention are readily accessible from the top of the container and as such cleaning is facilitated.

In an alternate scenario but based on the same embodiment, the assembled system will also be acknowledged for the ability to be cleaned in situ without the need to disassemble. In the same way as the method above, the accumulated contents of the interceptor will be removed. The outlet well assembly can be accessed via a vent fluidly connected to the outlet pipe 16 and located on the extended outlet system. The maintenance operative can simply introduce a pressurised water supply line via the vent passing it vertically down in an unrestricted fashion to the outlet well. The pressurised water actively moves any debris accumulated in the outlet well, via the openings 30 and 32 back into the tank, where the residue can be subsequently removed. This back flush cleaning may be performed on a regular basis.

The foregoing description describes various embodiments of the invention but the scope of the invention is limited only by the appended claims. Various modifications and alterations to the invention are possible without departing from the scope of the claims attached. Some of these have been discussed above and other will be apparent to those skilled in the art.

We claim:
1. An in-line grease interceptor comprising:
a bottom wall inside said in-line grease interceptor;
a chamber for holding waste water above said bottom wall;
an outlet for withdrawing said waste water from said chamber;
a well extending upwardly from said bottom wall into said chamber, said well having a) at least one continuous upstanding wall surrounding a hollow center space, and b) an open top;
a fitting removably attached to said well covering said open top, said fitting comprising:
at least one water inflow opening facing substantially toward said bottom wall;
at least one infiltration passageway hydraulically connecting said at least one water inflow opening to said hollow center space to allow said waste water to flow from said chamber into said hollow center space; and
a water removal passageway extending through said fitting, from said hollow center space to said outlet to allow said waste water to flow from said hollow center space to said outlet, when said fitting is attached to said well inside said chamber;
wherein said at least one upstanding wall is sized to space apart said at least one water inflow opening from said bottom wall, to prevent waste materials deposited on said bottom wall from being taken up into said hollow center space and being withdrawn from said chamber with said waste water.

2. The in-line grease interceptor of claim 1, wherein said fitting comprises at least two said water inflow openings and at least two said infiltration passageways.

3. The in-line grease interceptor of claim 2, wherein said fitting further comprises a pair of opposed arms extending horizontally outward from said at least one continuous upstanding wall, when said fitting is attached to said well; and wherein each one of said pair of opposed arms comprises one of said at least two infiltration passageways.

4. The in-line grease interceptor of claim 3, wherein said at least two water inflow openings are directed downwardly towards said bottom wall when said fitting is attached to said well inside said chamber, to prevent solids from drifting into said at least two water inflow openings from above said fitting.

5. The in-line grease interceptor of claim 1, wherein said fitting is removably attachable to said well by a press fit attachment.

6. The in-line grease interceptor of claim 1, wherein said fitting includes a pipe connector and a water removal pipe is connected to said pipe connector to form said water removal passageway.

7. The in-line grease interceptor of claim 1, where an inflow area of said at least one water inflow opening is about the same size in total combined area as a cross-sectional area of said water removal passageway.

8. The in-line grease interceptor of claim 1, wherein said fitting includes rounded upwardly facing surfaces to promote shedding of deposited waste materials.

9. The in-line grease interceptor of claim 8, wherein said rounded upwardly facing surfaces are configured to have a positive draft.

10. The in-line grease interceptor of claim 1, wherein said well is integrally formed with said bottom wall of said in-line grease interceptor.

11. The in-line grease interceptor of claim 4, wherein said at least two water inflow openings are directed downwardly towards said bottom wall at a 90 degree angle from a horizontal axis defined by said pair of opposed arms.

12. The in-line grease interceptor of claim 1, wherein said well is formed separately from said in-line grease interceptor, and configured to be disposed on said bottom wall of said in-line grease interceptor.

* * * * *